(12) United States Patent
Abarca Melo et al.

(10) Patent No.: US 8,658,071 B2
(45) Date of Patent: Feb. 25, 2014

(54) METHOD FOR LINING A PIPE OR ELBOW

(75) Inventors: Ricardo Abarca Melo, Santiago (CL); Wilfredo San Martin Cisterna, San Bernando (CL); Jaime Ramirez Toledo, Santiago (CL)

(73) Assignee: Weir Vulco, S.A., Santiago (CL)

( * ) Notice: Subject to any disclaimer, the term of this patent is extended or adjusted under 35 U.S.C. 154(b) by 518 days.

(21) Appl. No.: 12/735,216

(22) PCT Filed: Dec. 22, 2008

(86) PCT No.: PCT/AU2008/001894
§ 371 (c)(1),
(2), (4) Date: Sep. 10, 2010

(87) PCT Pub. No.: WO2009/079705
PCT Pub. Date: Jul. 2, 2009

(65) Prior Publication Data
US 2011/0018256 A1     Jan. 27, 2011

(30) Foreign Application Priority Data
Dec. 21, 2007    (CL) .................................... 3773-2007

(51) Int. Cl.
*B29C 45/14*     (2006.01)

(52) U.S. Cl.
USPC ............... 264/267; 264/36.15; 264/36.16; 264/36.17; 264/269; 264/270; 264/634; 264/636; 264/506; 264/512; 264/563; 264/573; 264/46.5; 264/46.6; 264/632; 264/338

(58) Field of Classification Search
USPC .............. 264/267, 241, 261, 269, 270, 271.1, 264/266, 259, 36.15, 36.16, 632
See application file for complete search history.

(56) References Cited

U.S. PATENT DOCUMENTS

| | | | | |
|---|---|---|---|---|
| 4,107,254 A | * | 8/1978 | Webster et al. | 264/270 |
| 4,680,066 A | * | 7/1987 | Wood | 156/156 |
| 4,995,929 A | | 2/1991 | Menzel | |
| 5,700,110 A | * | 12/1997 | Kamiyama et al. | 405/184.2 |
| 6,672,857 B2 | | 1/2004 | Hecken et al. | |
| 2002/0007783 A1 | * | 1/2002 | Hecken et al. | 118/105 |
| 2006/0130922 A1 | * | 6/2006 | Kamiyama et al. | 138/98 |

FOREIGN PATENT DOCUMENTS

| | | | |
|---|---|---|---|
| EP | 0787940 | * | 8/1997 |
| GB | 2159598 | | 12/1985 |
| JP | 62-71564 | | 4/1987 |
| JP | 2004-232674 | | 8/2004 |

* cited by examiner

*Primary Examiner* — Jeffrey Wollschlager
*Assistant Examiner* — Stella Yi
(74) *Attorney, Agent, or Firm* — Morriss O'Bryant Compagni (57) ABSTRACT

A method for enabling a lining (14) to be applied to a pipe elbow or bend C comprises the steps of connecting a tie member (12) to an end of a flexible elongate mandrel (1), drawing the tie member through the elbow or bend so as to draw the mandrel therethrough and locate opposing ends of the mandrel adjacent to opposing respective ends of the elbow or bend, and securing the mandrel ends in relation to the respective ends of the elbow or bend. The mandrel can be adapted to the elbow or bend by locating the elbow or bend in a given orientation and deriving a profile S of the elbow or bend while in that orientation, removing the elbow or bend and then locating the mandrel in the given orientation, and adjusting the mandrel in relation to the profile of the elbow or bend to adapt it thereto.

32 Claims, 7 Drawing Sheets

METHOD FOR LINING A PIPE OR ELBOW

TECHNICAL FIELD

Disclosed is a method for internally lining/coating a pipe in the form of a bend or elbow, whereby a mandrel is located inside the bend or elbow and then a lining/coating material is introduced to fill an annular space between the mandrel and the bend or elbow interior wall. The resultant lined/coated pipe bend or elbow finds particular though not exclusive application in the mining and chemical industries when transporting abrasive, erosive and corrosive slurries, concentrates, tailings and other flowable solid and/or liquid mixtures.

The term "pipe" as employed herein is intended to include ducts, conduits, pipelines, tubes, chutes, cylinders and so on. The terms "lining" and "coating" will and can be used interchangeably throughout this document with respect to the lining/coating formed inside the bend or elbow.

BACKGROUND ART

The mining industry employs ore and concentrate pipes to transport ores, concentrates, tailings and other materials over long distances. Such pipes can be constructed from metal/metallic sections joined together to form an extended pipeline, and the ores being conveyed can often be in the form of wet slurries or even dry particulate solids.

Many changes of direction can occur along the path of such pipelines, both in the vertical and in the horizontal plane, requiring the use of elbows and bends. Some such elbows and bends can turn the pipeline up to angles of 180°, for example, in energy dissipation stations used with pipelines that fall from elevations exceeding 500 meters.

When transporting material such as abrasive/erosive/corrosive slurries, concentrates, tailings, a high level of pipe erosion can occur, especially at any bends in the pipeline, and most especially where the bends are located at the end of a pipeline fall. To avoid wear and/or corrosion, the piping can be internally coated with an elastomeric material (e.g. rubber, or a synthetic material such as polyurethane or the like).

Pipe diameters in such pipelines can vary between 50 and 500 mm, with it being desirable for each given pipe diameter to have a continuous coating of elastomeric material throughout its length. In some instances a specific uniform thickness is desirable and the coating thickness is selected specifically to the pipe diameter.

Coatings of rubber are most used for coarse particulate materials with a size above 2 mm due to the better resistance afforded by rubber at such particle sizes. For smaller particle size materials, polyurethane offers better resistance to abrasion. Thus, for materials such as concentrates and tailings, usually polyurethane is used as the coating material.

A uniform coating is more easily applied to straight sections of pipe, but less so in the bends and elbows, where it is difficult to achieve a uniform thickness, especially when the coating to be applied is of a synthetic type, such as polyurethane.

Co-pending PCT/AU2008/001757 discloses a general method and apparatus for internally coating a pipe in the form of an elbow or bend, though not a method for drawing a mandrel in the elbow or bend, or adapting the mandrel prior to locating it in the elbow or bend.

A reference herein to prior art is not an admission that the art forms a part of the common general knowledge of a person of ordinary skill in the art, in Australia or elsewhere.

SUMMARY OF THE DISCLOSURE

In a first aspect there is disclosed a method for enabling a lining to be applied to a pipe elbow or bend, the method comprising the steps of:

connecting a tie member to an end of a flexible elongate mandrel;

drawing the tie member through the elbow or bend so as to draw the mandrel therethrough and locating opposing ends of the mandrel adjacent to opposing respective ends of the elbow or bend; and securing the mandrel ends in relation to the respective ends of the elbow or bend.

The method provides a simple and rapid means for locating a mandrel in an elbow or bend, ready for an internal lining to then be applied thereto. The radius of curvature of the mandrel can be adapted (matched) to the internal radius of curvature of the pipe elbow or bend so as to define an annular space between the elbow/bend internal wall and the mandrel's external surface.

In one embodiment of the method, an end of the tie member can be connected to a mounting member that is adapted for being secured to the mandrel end. The mandrel end may have a disc formed thereat. The mounting member can also take the form of a disc that is adapted for being fastened to the mandrel disc (e.g. in a fast and secure manner by bolting). The tie member can take the form of a cable (e.g. that is relatively inflexible).

In one embodiment each mandrel end can be secured in relation to its respective end of the elbow or bend by a connection flange. Further, each connection flange can be adapted for being releasably coupled to a respective mandrel end by one or more releasable fasteners (e.g. bolts). In addition, each connection flange can also be adapted for being mounted to a respective flange of the elbow or bend end by one or more releasable fasteners (e.g. bolts).

In this embodiment one of the connection flanges can comprise a pathway therethrough, wherein a lining material can be introduced via the pathway and into an annulus-shaped space defined between the mandrel and elbow or bend. The connection flange can thus provide a simple and rapid means of securing the mandrel end as well introducing the lining material.

In one form the mandrel can be sized and/or shaped adaptively to the elbow or bend. In one embodiment, the adaptive sizing and/or shaping of the mandrel can include adjusting the mandrel length and/or curvature with respect to the elbow or bend. This can occur prior to drawing the mandrel into the elbow or bend and/or after drawing it thereinto.

For example, the mandrel length can be adjusted by locating one or more washers at an end thereof. The mandrel curvature (e.g. radius of curvature) can be adjusted by locating one or more wedges at an end thereof. The curvature of the mandrel can be optimally controlled so as to promote equidistance from the elbow or bend internal wall in situations where a uniform thickness of lining is needed on the interior surface of the pipe elbow or bend.

When adjusted prior to location in the elbow or bend, a graphical profile of the elbow or bend can be generated and the mandrel can then be sized and/or shaped adaptively to the elbow or bend profile. In this case the graphical profile can be generated on a flat surface above which the elbow or bend has been fixedly mounted at locational flanges, and to which flanges the mandrel can then be mounted for adaptive sizing and/or shaping after the elbow or bend has been removed.

When adjusted after location in the elbow or bend, the location of the mandrel in the elbow or bend can be probed, and the mandrel is then sized and/or shaped adaptively to the elbow or bend. In this case the location of the mandrel in the elbow or bend can be probed using X-Ray or another locational technique (e.g. camera, sensors, ultrasound, etc).

In one embodiment the method can comprise a further step of coating a surface of the mandrel with a release agent. The mandrel may optionally be protected with a sheath prior to drawing it into the elbow or bend, and the sheath can be removed from the mandrel prior to securing its end with respect to the ends of the elbow or bend.

In one embodiment the method can comprise a further step of introducing a lining material so as to flow into and fill a space defined between the mandrel and an internal surface of the elbow or bend. In addition, in one embodiment the method can comprise an intermediate step of preheating the assembled elbow or bend and mandrel prior to introducing the lining material therein. The assembled elbow or bend and mandrel may be preheated for 2-10 hours at a temperature ranging between 80 and 120° C.

In one embodiment the method can comprise a further step of curing the lining material. The lining material may be cured by heating for 6 to 15 hours at a temperature ranging between 80 and 120° C. In one embodiment the method can comprise a further step of cooling the elbow or bend.

In one embodiment the method can comprise a further step of detaching the mandrel ends from the respective ends of the elbow or bend. The method may then comprise a further step of removing the mandrel so as to leave the lining material behind on the internal surface of the elbow or bend. In this regard, an end of the tie member can be connected to a mounting member that is in turn secured to the mandrel end whereby, when tension is applied to the tie member, the mandrel is extracted out of the elbow or bend.

In a second aspect there is disclosed a method for adapting a flexible elongate mandrel to a pipe elbow or bend, the method comprising the steps of:

locating the elbow or bend in a given orientation and deriving a profile of the elbow or bend whilst in that orientation;

removing the elbow or bend and then locating the mandrel in the given orientation;

adjusting the mandrel in relation to the profile of the elbow or bend, to adapt it thereto.

Such a method can better adapt the mandrel to each given elbow or bend. In this regard, each given elbow or bend can present minute differences between each other elbow or bend, both in terms of dimension and radius of curvature. The method of the second aspect enables the mandrel length and curvature radius to be adapted to each particular elbow or bend.

In the method of the second aspect, the profile of the elbow or bend can take the form of a graphical representation that is formed on a surface underlying the elbow or bend in the given orientation. When the term "deriving a profile" is used throughout this specification, this can be broadly interpreted to also include methods such as making such a graphical representation, or alternatively using computer imaging, photographs or some other optimetric analysis of the profile of the elbow or bend. However it is achieved, this profile is then used to adjust the shape of the mandrel into a selected shape for repositioning into the elbow or bend in use.

In the method of the second aspect the elbow or bend can be located in the given orientation by mounting it to fixed flanges. Then, removal of the elbow or bend can be accomplished by detaching the elbow or bend from the fixed flanges. Further, the location of the mandrel in the given orientation may then be accomplished by mounting it to the fixed flanges.

In the method of the second aspect the adjustment of the mandrel in relation to the profile can be made so as to change the mandrel's curvature and/or length.

In the method of the second aspect, adjustment of the mandrel's curvature may be made so as to maintain equidistance from the elbow or bend wall as indicated by the profile. In this regard, the mandrel's curvature may be adjusted by locating one or more wedges at an end thereof.

In the method of the second aspect, adjustment of the mandrel's length may be made so as to match the elbow or bend length. In this regard, the mandrel's length may be adjusted by locating one or more washers at an end thereof.

The method of the second aspect that adapts a mandrel to a pipe elbow or bend, can be employed to enable the mandrel to be suitable for use in the method of the first aspect.

BRIEF DESCRIPTION OF THE DRAWINGS

Notwithstanding any other forms that may fall within the scope of the method as set forth in the Summary, a specific embodiment of the method will now be described, by way of example only, and with reference to the accompanying drawings in which.

DETAILED DESCRIPTION OF A SPECIFIC EMBODIMENT

Figure 1:
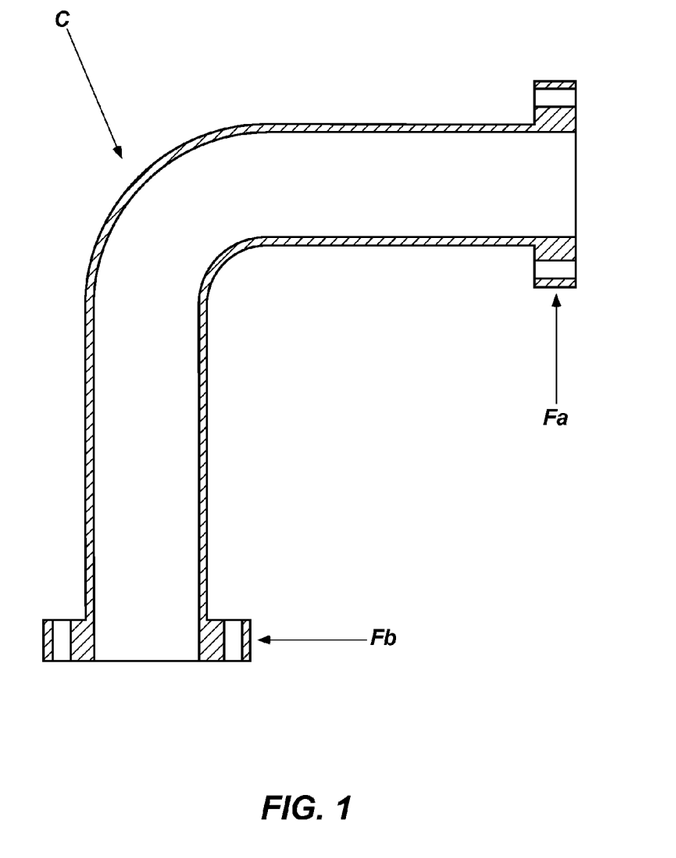
FIG. 1 shows a cross-section of a 90° elbow.

FIG. 1 shows a cross-section of a to-be-coated/lined elbow or bend C having joining flanges F (Fa and Fb).

Figure 2:
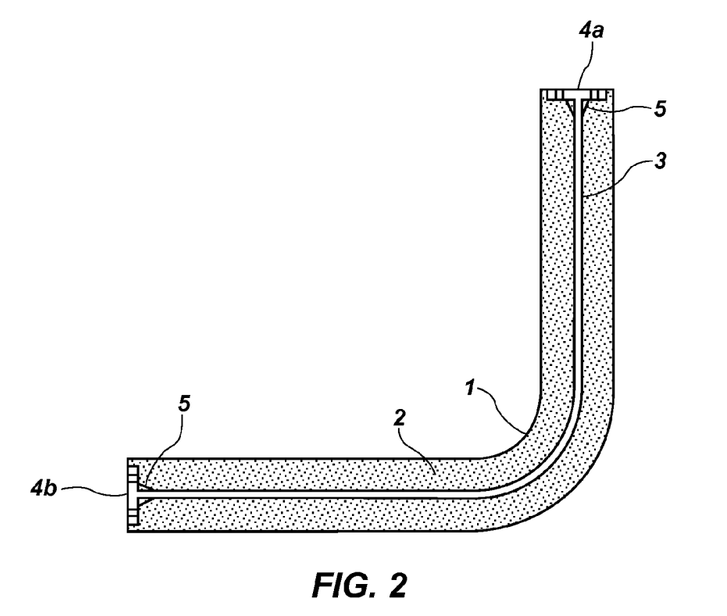
FIG. 2 shows a cross-section of a mandrel to be employed in the method.

FIG. 2 shows an elongate mandrel 1 that is formed from a cylindrical body 2 (typically of an elastomeric material such as polyurethane). The mandrel has a flexible/bendable core 3 (typically of a bendable metallic or polymeric fibre material) arranged in the centre of the cylindrical body 2.

Two discs 4a and 4b are located at opposite ends of the mandrel 1 and are joined to the core 3 by a fastening mechanism, such as by web stiffeners 5 (e.g. that are welded or bolted thereto). Before introducing the mandrel 1 into the elbow, its surface is covered with a release agent in the form of a chemical stripper and, further, it is protected with a sheath (i.e. to protect its surface against damage during installation in the elbow).

Figure 3:
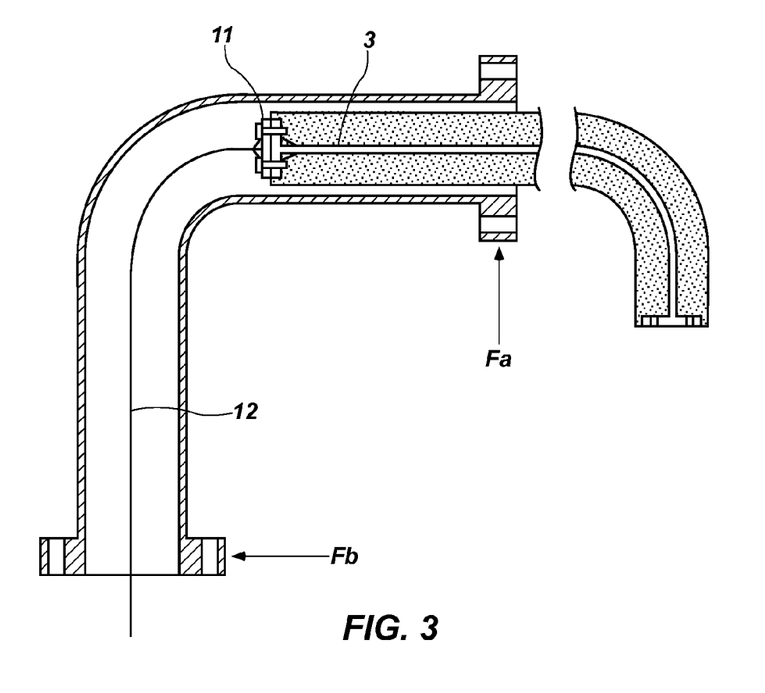
FIG. 3 illustrates the initial placement of the mandrel of FIG. 2 inside the elbow of FIG. 1.

In accordance with the present method, to enable the mandrel 1 to be located inside the elbow or bend, a mounting member in the form of a disc 11 is fastened (e.g. bolted) to a disc 4b. The disc 11 includes an attachment formation 11a which is configured for engaging a tie member in the form of a hauling cable 12 (FIG. 3). The hauling cable is tensioned to pull the mandrel 1 into a suitable position (FIG. 4).

Figure 5:
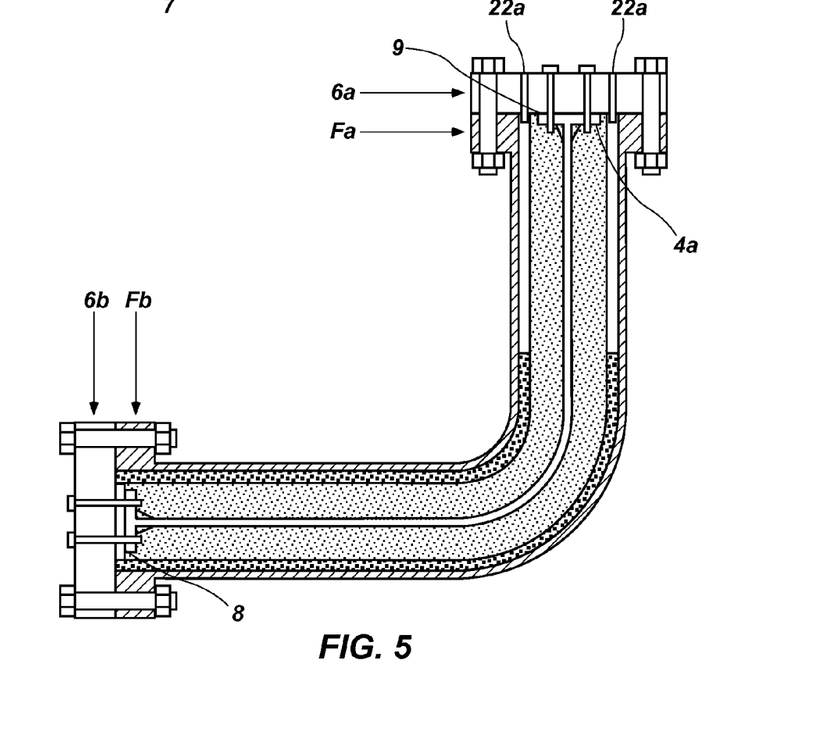
FIG. 5 illustrates the elbow of FIG. 4 in a vertical (pouring) orientation where a lining has been half-poured thereinto.
Figure 6:
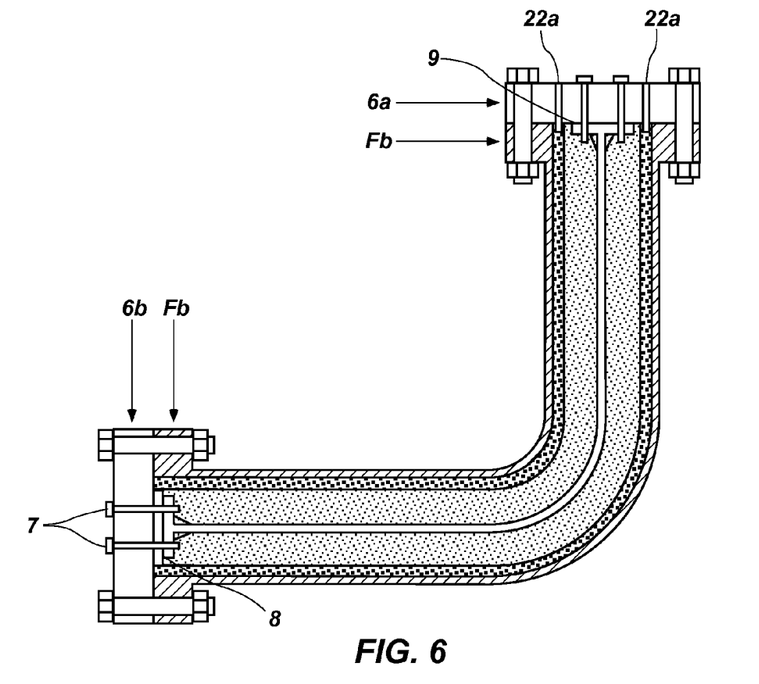
FIG. 6 illustrates the elbow where the lining has been fully poured thereinto.

Once the mandrel 1 is in position, its protecting sheath is removed. The mandrel length is adjusted, as necessary, according to the path length of the elbow C by means of washers 8 which are fastened to either or both of the discs 4a and 4b (FIGS. 4, 5 and 6). Also, the mandrel curvature within the elbow is adjusted to achieve equidistance from the elbow inner wall and to obtain a fill annulus of uniform thickness. This curvature adjustment is accomplished by inserting wedges 9 adjacent to either or both of the discs 4a and 4b and, when present, adjacent to the washers 8. The control of such adjustment can be performed visually and/or by X-ray, probes, cameras etc. The diameter of the washers and wedges is selected so as not to extend beyond the diameter of the mandrel.

Figure 4:
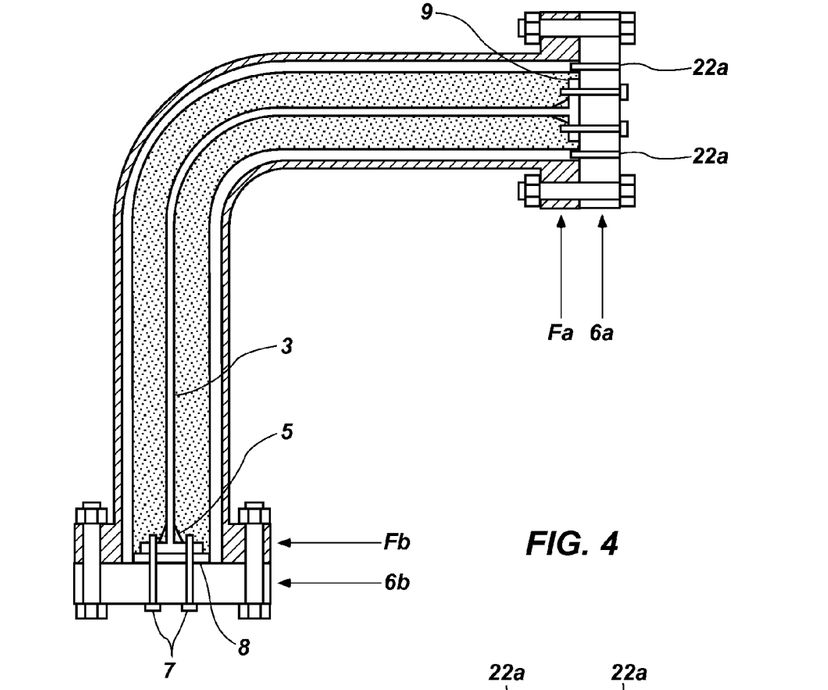
FIG. 4 shows the mandrel having been secured to the elbow.

Then, connection flanges in the form of discrete flanges 6a and 6b are joined to the discs 4a and 4b by bolts 7 (FIG. 4). The mandrel 1 is then secured to the elbow by bolting the flanges 6a and 6b to the flanges Fa and Fb of the elbow or bend C.

It will be noted that flange 6a is provided with a lining material pathway in the form of two holes 22a, one for pouring the pipe lining material (e.g. an erosion-resistant elastomeric material such as polyurethane) into the annulus-shaped space defined between the mandrel outer surface and the interior surface of the elbow wall, and the other for exhausting air and other gases within the annulus-shaped space during such pouring.

For better pouring, and to obtain a tensionless coating, the elbow (with mandrel 1 therein) can be pre-heated to a temperature ranging between 80 and 120° C. over a period ranging from 2 to 10 hours. Prior to pouring, the elbow (with mandrel therein) is orientated so that flange 6a is in a horizontal position (FIG. 5).

FIG. 6 depicts and intermediate point in the pouring process to form the lining/coating. At completion of pouring, the lining/coating is cured. To this effect, the elbow is heated with the mandrel therein to a temperature ranging between 80 and 120° C. for 6 to 15 hours.

After curing, the elbow including the mandrel 1 is cooled. This cooling process can take place naturally in air or by employing forced cooling (e.g. using a cooling fluid).

Figure 7:
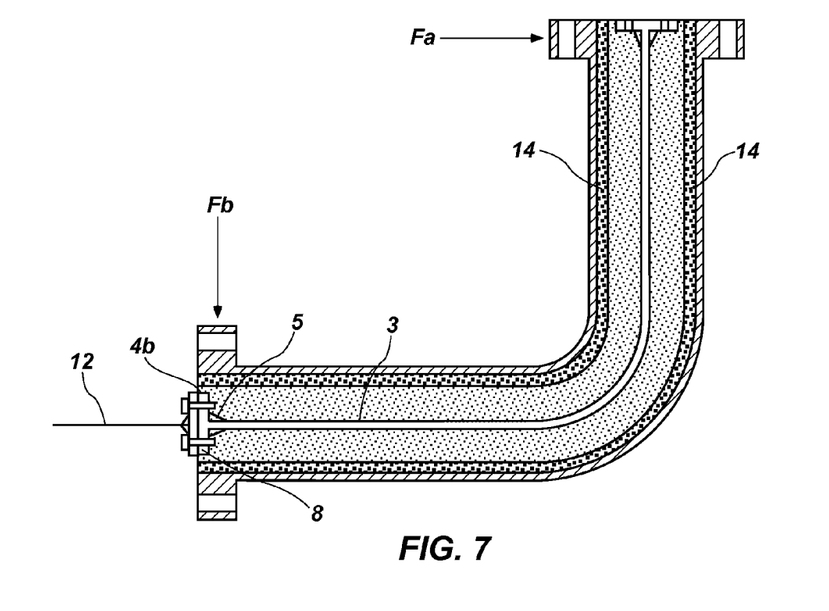
FIG. 7 illustrates the elbow with mandrel-securing flanges removed, and with the mandrel connected to a cable and ready to be extracted from the elbow.

As shown in FIG. 7, to extract the mandrel after cooling, flanges 6a and 6b are removed and disc 11 is connected (e.g. bolted) to disc 4b. The hauling cable 12 is attached to the attachment formation 11a and is then tensioned to extract the mandrel 1 from the elbow.

Figure 8:
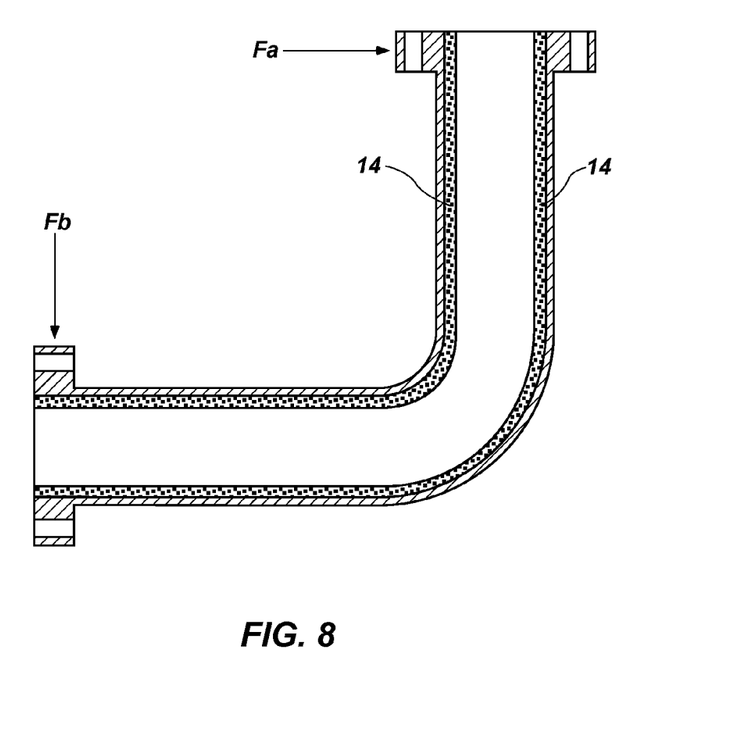
FIG. 8 shows the elbow with the mandrel removed therefrom, and an internal lining/coating remaining.

FIG. 8 illustrates the resultant lined/coated elbow (i.e. having a coating 14).

Both the pre-heating and the curing stages can be performed in an oven, or by arranging the elbow in a hot gas current, or by electromagnetic induction, or by radio frequency, or by another procedure for heating metallic pieces.

Whilst control of mandrel curvature adjustment is accomplished using X-ray (i.e. to permit viewing of the mandrel position throughout the elbow interior) other techniques can be employed including fibre optic cameras and probes, visual inspection under illumination at each end etc.

Example 1

A specific technique that was employed to control the adjustment of the mandrel curvature inside the elbow or bend will now be described.

Figure 9:
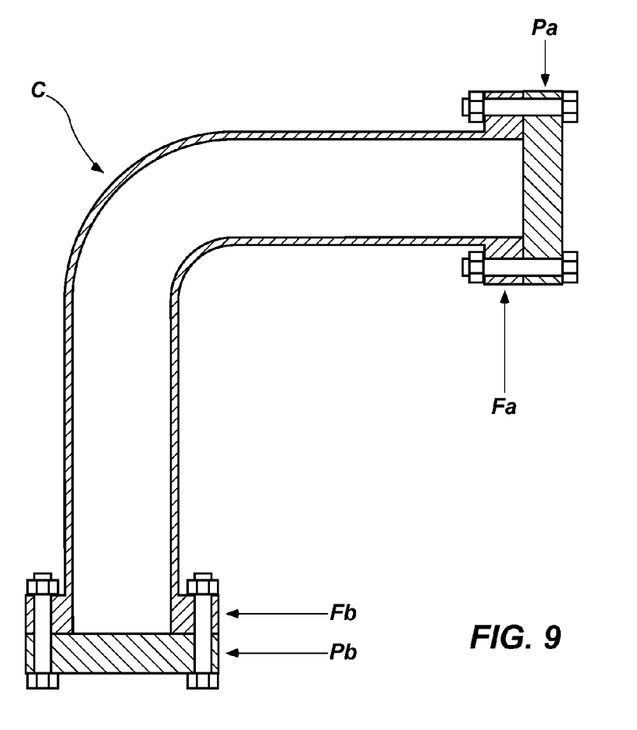
FIG. 9 illustrates an elbow with its flanges fastened to mounting flanges which secure it to a flat surface.

Referring to FIG. 9, the flanges Fa and Fb of the elbow C were joined (e.g. bolted) to locational flanges in the form of special mounting flanges Pa and Pb. Flanges Pa and Pb mimicked flanges 6a and 6b insofar as their dimension and bolt number. The assembly was then secured on a flat surface, with only flanges Pa and Pb being fixed to the surface (FIG. 9).

Figure 10:
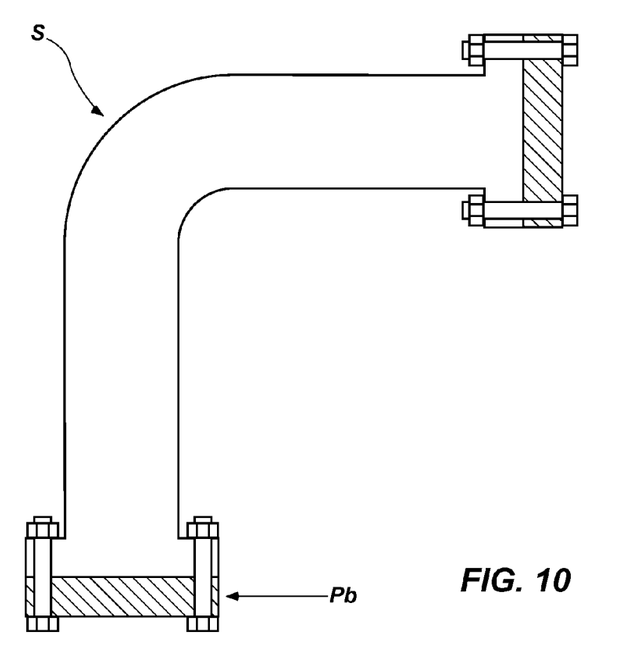
FIG. 10 shows a profile (in outline) of the elbow drawn onto the flat surface.

Referring now to FIG. 10, the contour profile S that elbow C projected over the flat surface was then drawn, and then the elbow was removed, whilst maintaining the flanges Pa and Pb secured to the flat surface (FIG. 10).

Figure 11:
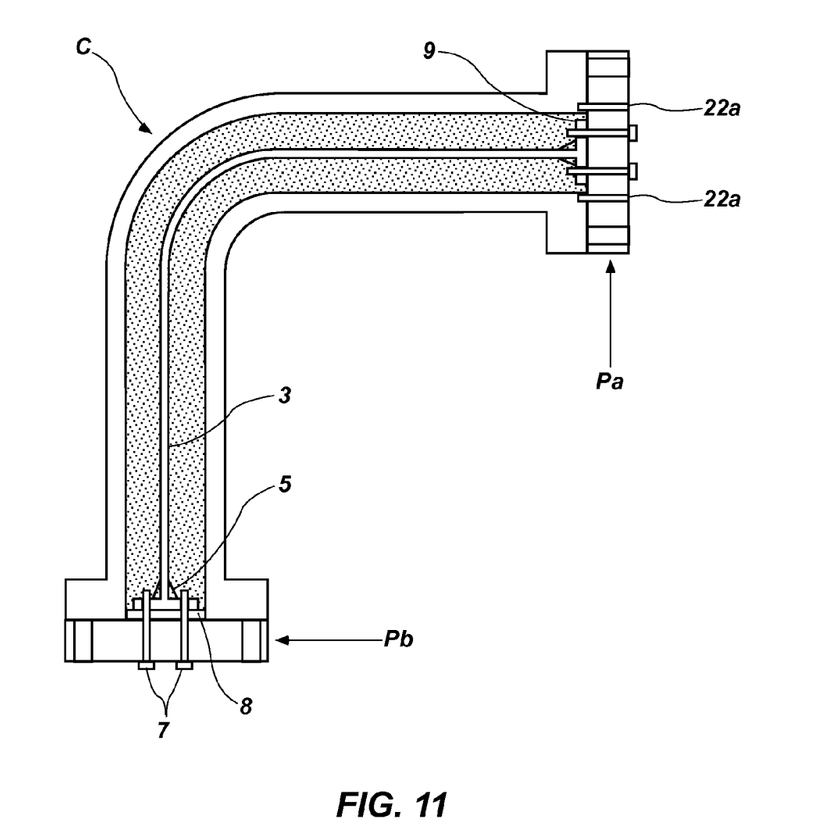
FIG. 11 shows the mandrel fastened to the mounting flanges, above the profile of FIG. 10, with the mounting flanges still secured to the flat surface.

The mandrel 1 was now fixed by bolts 7 to the flanges Pa and Pb and its length was adjusted using washers 8 and its curvature was adjusted using wedges 9. In a first procedure the washers 8 were abutted to flange Pb and the wedges 9 were abutted to flange Pa. Control of the mandrel curvature adjustment was achieved by visually observing the relative position of the mandrel in respect of the elbow contour S. The appropriate adjustment was then made by changing the inclination and relative positioning of the wedge(s).

Once length and curvature adjustment was completed, the relative position of the washers and wedges was marked. The mandrel was then removed from flanges Pa and Pb and elbow C was mounted, replicating in the elbow the previously obtained position of the washers and wedges.

The mandrel so prepared was already adapted to the curvature of the elbow, better ensuring that a uniform space for the lining material was formed between the elbow internal walls and the mandrel external surface.

The steps of the technique were as follows:
(a) The elbow C was secured by flanges Pa and Pb on a flat surface.
(b) The contour profile S projected by the elbow on the surface was drawn.
(c) The elbow C was detached, leaving flanges Pa and Pb fixed on the surface.
(d) The mandrel 1 was secured to flanges Pa and Pb.
(e) The mandrel length was adjusted to the length of the elbow using washers 8 placed adjacent to flange Pb.
(f) The mandrel curvature was adjusted to the elbow curvature using wedges 9 placed adjacent to flange Pa.
(g) Fine adjustments were made to control mandrel equidistance to the elbow walls, by observing (i.e. from above) the relative position of the mandrel relative to the profile S on the surface.
(h) The relative positioning of the washers and wedges was marked.
(i) The mandrel was detached from flanges Pa and Pb.
(j) The mandrel was then located in elbow C by replicating the same relative position of the washers and wedges in relation to the flanges 6a and 6b.

Example 2

A specific technique that was employed to locate the mandrel inside the elbow or bend, and then apply a lining/coating thereto, will now be described.
(a) The surface of mandrel 1 was coated (e.g. sprayed/painted) with a stripper and protected with a sheath.
(b) Disc 11 was secured on disc 4b together with the hauling cable 12.
(c) The mandrel was introduced inside the elbow and tension was applied thereto using cable 12 to locate it in approximate position in the elbow.
(d) The protective sheath was removed.
(e) The mandrel length was adjusted according to the elbow length by locating washers 8 adjacent to flange 6b.

(f) The mandrel radius of curvature was adjusted according to the elbow curvature by locating wedges 9 adjacent to flange 6a (FIG. 4).

(g) Fine adjustments to ensure mandrel equidistance were made in conjunction with a suitable probing technique (e.g. X-Ray).

(h) The mandrel was joined to the elbow using flanges 6a and 6b and flanges Fa and Fb (FIG. 4).

(i) The elbow/mandrel assembly was preheated (e.g. in an oven) for 2-10 hours at a temperature ranging between 80 and 120° C.

(j) The elbow was then positioned so that flange 6a was horizontal (FIG. 5).

(k) A polyurethane lining material was poured through one of the holes 22a, while air and other gases were allowed to exhaust through the other hole 22a (FIGS. 5 and 6).

(l) Once fully poured, the polyurethane lining was cured by heating the assembly for 6 to 15 hours at a temperature ranging between 80 and 120° C.

(m) The elbow/mandrel assembly was then cooled in a cooling air stream.

(n) The bolts joining flanges 6a and 6b to flanges Fa and Fb, and the bolts 7 securing flanges 6 to discs 4 were removed (FIG. 7).

(o) The disc 11 was fastened to disc 4b together with the hauling cable 12 (FIG. 7).

(p) The elbow was secured (e.g. in a vice-like mechanism) and the mandrel was removed by applying tension to cable 12.

Whilst the method has been described with reference to a specific embodiment, it should be appreciated that it can be embodied in many other forms.

In the claims which follow and in the preceding description, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the method.

The invention claimed is:

1. A method for enabling a lining to be applied to a pipe elbow or bend, the method comprising the steps of:
providing a pipe elbow or bend having an interior surface for lining, and having opposed ends;
providing a flexible elongate mandrel having opposing ends, the flexible elongate mandrel being adaptively sized or shaped to the size or shape of the pipe elbow or bend;
connecting a tie member to an end of the flexible elongate mandrel;
drawing the tie member through the elbow or bend so as to draw the mandrel therethrough and locating opposing ends of the mandrel adjacent to opposing respective ends of the elbow or bend; and
securing the mandrel ends in relation to the respective ends of the elbow or bend leaving a space between the mandrel and the interior surface of the pipe elbow or bend into which a lining may be formed to the interior surface of the pipe elbow or bend.

2. A method as claimed in claim 1 wherein an end of the tie member is connected to a mounting member that is adapted for being secured to the mandrel end.

3. A method as claimed in claim 2 wherein the mandrel end has a disc formed thereat and the mounting member is a disc that is adapted for being fastened to the mandrel disc.

4. A method as claimed in claim 1 wherein each mandrel end is secured in relation to its respective end of the elbow or bend by a connection flange.

5. A method as claimed in claim 4 wherein each connection flange is adapted for being releasably coupled to a respective mandrel end by one or more releasable fasteners, and is also adapted for being mounted to a respective flange of the elbow or bend end by one or more releasable fasteners.

6. A method as claimed in claim 5 wherein each of the releasable fasteners is a bolt.

7. A method as claimed in claim 4 wherein one of the connection flanges comprises a pathway therethrough, wherein a lining material can be introduced via the pathway and into an annulus-shaped space defined between the mandrel and elbow or bend.

8. A method as claimed in claim 1 wherein the adaptive sizing and/or shaping of the mandrel includes adjusting the mandrel length and/or curvature with respect to the pipe elbow or bend:
(i) prior to drawing it thereinto; and/or
(ii) after drawing it thereinto.

9. A method as claimed in claim 8 wherein, in the case of (i) and (ii), the mandrel length is adjusted by locating one or more washers at an end thereof, and wherein the mandrel curvature is adjusted by locating one or more wedges at an end thereof.

10. A method as claimed in claim 9 wherein, in the case of (i) and (ii), curvature of the mandrel is controlled so as to promote equidistance from the elbow or bend internal wall.

11. A method as claimed in claim 8 wherein:
in the case of (i), a graphical profile of the elbow or bend is generated and the mandrel is then sized and/or shaped adaptively to the elbow or bend profile; and
in the case of (ii) the location of the mandrel in the elbow or bend is probed, and the mandrel is then sized and/or shaped adaptively to the elbow or bend.

12. A method as claimed in claim 11 wherein:
in the case of (i) the graphical profile is generated on a flat surface above which the elbow or bend has been fixedly mounted at locational flanges, and to which flanges the mandrel is then mounted for adaptive sizing and/or shaping after the elbow or bend has been removed; and
in the case of (ii) the location of the mandrel in the elbow or bend is probed using X-Ray or another locational technique.

13. A method as claimed in claim 1 comprising a further step of coating a surface of the mandrel with a release agent and then protecting it with a sheath prior to drawing it into the elbow or bend.

14. A method as claimed in claim 13 wherein the sheath is removed from the mandrel prior to securing its end with respect to the ends of the elbow or bend.

15. A method as claimed in claim 1 comprising a further step of introducing a lining material so as to flow into and fill a space defined between the mandrel and an internal surface of the elbow or bend.

16. A method as claimed in claim 15 comprising an intermediate step of preheating the assembled elbow or bend and mandrel prior to introducing the lining material therein.

17. A method as claimed in claim 16 wherein the assembled elbow or bend and mandrel is preheated for 2-10 hours at a temperature ranging between 80° C. and 120° C.

18. A method as claimed in claim 15 comprising a further step of curing the lining material.

19. A method as claimed in claim 18 wherein the lining material is cured by heating for 6 to 15 hours at a temperature ranging between 80° C. and 120° C.

20. A method as claimed in claim 18 comprising a further step of cooling the elbow or bend.

21. A method as claimed in claim 15 comprising a further step of detaching the mandrel ends from the respective ends of the elbow or bend.

22. A method as claimed in claim 15 comprising a further step of removing the mandrel so as to leave the lining material behind on the internal surface of the elbow or bend.

23. A method as claimed in claim 22 wherein an end of the tie member is connected to a mounting member that is in turn secured to the mandrel end, whereby tension is applied to the tie member to extract it out of the elbow or bend.

24. A method as claimed in claim 1 wherein the tie member is a cable.

25. A method for adapting a flexible elongate mandrel to a pipe elbow or bend, the method comprising the steps of:
   providing a pipe elbow or bend;
   providing a flexible elongate mandrel;
   fixing the pipe elbow or bend and locating it in a given orientation and deriving a profile of the elbow or bend whilst in that orientation;
   removing the pipe elbow or bend from its fixed location and then locating the flexible elongate mandrel in the given orientation; and
   adjusting the flexible elongate mandrel in relation to the profile of the pipe elbow or bend to adapt it thereto.

26. A method as claimed in claim 25 wherein the profile of the elbow or bend is a graphical representation thereof that is formed on a surface underlying the elbow or bend in the given orientation.

27. A method as claimed in claim 25 wherein the elbow or bend is located in the given orientation by mounting it to fixed flanges.

28. A method as claimed in claim 27 wherein removal of the elbow or bend is accomplished by detaching it from the fixed flanges, and location of the mandrel in the given orientation is then accomplished by mounting it to the fixed flanges.

29. A method as claimed in claim 25 wherein adjustment of the mandrel in relation to the profile is made so as to change its curvature and/or length.

30. A method as claimed in claim 29 wherein adjustment of the mandrel's curvature is made so as to maintain equidistance from the elbow or bend wall as indicated by the profile, and adjustment of the mandrel's length is made so as to match the elbow or bend length.

31. A method as claimed in claim 30 wherein the mandrel's curvature is adjusted by locating one or more wedges at an end thereof, and wherein the mandrel's length is adjusted by locating one or more washers at an end thereof.

32. A method as claimed in claim 25 that is employed to enable the mandrel to be suitable for use in the method comprising the steps of:
   connecting a tie member to an end of the flexible elongate mandrel;
   drawing the tie member through the pipe elbow or bend so as to draw the mandrel therethrough and locating opposing ends of the mandrel adjacent to opposing respective ends of the pipe elbow or bend; and
   securing the mandrel ends in relation to the respective ends of the elbow or bend leaving a space between the mandrel and the interior surface of the pipe elbow or bend into which a lining may be formed to the interior surface of the pipe elbow or bend.

* * * * *